United States Patent [19]

Ikeda

[11] Patent Number: 4,875,342

[45] Date of Patent: Oct. 24, 1989

[54] TEMPERATURE CONTROL MEANS FOR A REFRIGERATING APPARATUS

[75] Inventor: Susumu Ikeda, Moro Isesaki, Japan

[73] Assignee: Sanden Corporation, Gunma, Japan

[21] Appl. No.: 61,475

[22] Filed: Jun. 15, 1987

[30] Foreign Application Priority Data

Jun. 14, 1986 [JP] Japan .................... 61-90019[U]

[51] Int. Cl.$^4$ ............................ G05D 15/00
[52] U.S. Cl. ......................... 62/115; 165/26; 236/78 R; 364/551
[58] Field of Search .......... 236/78 D, 78 R, 94; 62/228, 115; 364/557; 165/11 R, 26

[56] References Cited

U.S. PATENT DOCUMENTS

| | | | |
|---|---|---|---|
| 4,399,428 | 8/1983 | Hughes et al. | 165/26 X |
| 4,421,269 | 12/1983 | Ts'ao | 236/94 |
| 4,738,117 | 4/1988 | Takasugi | 62/200 |

FOREIGN PATENT DOCUMENTS

| | | | |
|---|---|---|---|
| 0068417 | 5/1980 | Japan | 236/94 |
| 0182723 | 10/1983 | Japan | 236/94 |
| 965503 | 8/1962 | United Kingdom | 236/46 R |

OTHER PUBLICATIONS

Modern Dictionary of Electronics, Graf, 2/1973, p. 141.

Primary Examiner—William E. Wayner
Attorney, Agent, or Firm—Banner, Birch, McKie & Beckett

[57] ABSTRACT

A temperature control device for a refrigerating apparatus is disclosed. The temperature control device is provided with a controlled temperature determining circuit to determine the temperature condition of the refrigerating chamber in accordance with the operation of a plurality of switches connected with the circuit. Therefore, the temperature condition in the refrigerating chamber can be controlled and maintained at a predetermined level in accordance with the operation of the temperature determining switches.

6 Claims, 1 Drawing Sheet

TEMPERATURE CONTROL MEANS FOR A REFRIGERATING APPARATUS

BACKGROUND OF THE INVENTION

This invention relates to a temperature control means, which is suitable for controlling the temperature of a refrigerating chamber.

Generally, the temperature in a refrigerating chamber is detected by a temperature control means, and the operation of a refrigerating apparatus to cool down the refrigerating chamber is controlled by an output signal from the temperature control means. Therefore, the temperature in the refrigerating chamber is maintained at or below a predetermined temperature by the refrigerating apparatus. This predetermined temperature is determined by temperature determining switches which are part of the temperature control means.

However, if the refrigerating chamber is adapted to allow several temperature conditions to accommodate various types of merchandise, or the like, which have to be kept at different temperatures, several temperature determining switches are required to determine and maintain the temperature in the refrigerating chamber. Particularly when there is a plurality of small transportable refrigerating containers which must be maintained under different temperature conditions, each container should be provided with a plurality of temperature determining switches.

SUMMARY OF THE INVENTION

It is an object of this invention to provide a temperature control means for a refrigerating apparatus in which the temperature in the refrigerating chamber is easily maintained under several temperature conditions with a simple structure.

It is another object of this invention to provide a temperature control means which determines several controlled temperature conditions with a small number of switches.

According to the present invention, there is provided a temperature control means for a refrigerating apparatus including a temperature detecting device, a plurality of temperature determining switches, controlled temperature determining circuit from which is output several different predetermined temperature signals in accordance with the operation of the switches and a comparator circuit which compares the output signals from the temperature detecting device with the output signals from the controlled temperature determining circuit. The operation of the refrigerating apparatus is controlled by output signals from the comparator circuit to control and maintain the temperature to be at a predetermined level.

Further objects, features and aspects of this invention will be understood from the following detailed description of the preferred embodiment of this invention with reference to the attached drawing.

DETAILED DESCRIPTION

Figure 1:
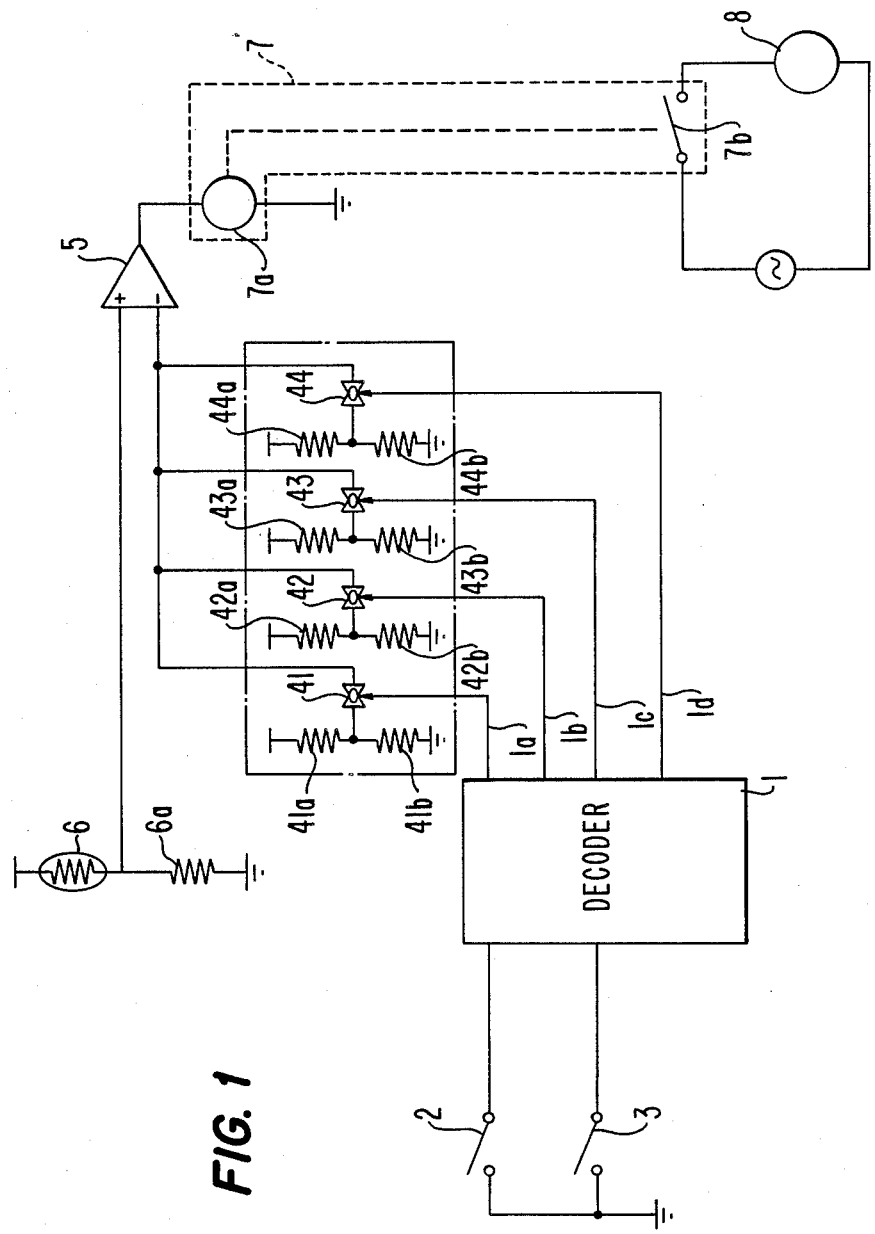
FIG. 1 is a schematic representation of the temperature control means in accordance with this invention.

A temperature control means which is suitable for use with a refrigerating apparatus to maintain the temperature in a refrigerating chamber under a predetermined temperature includes a decoder 1 whose input is connected to temperature determining switches 2, 3. Output terminals 1a, 1b, 1c and 1d of decoder 1 are respectively connected to analog switches 41, 42, 43 and 44. One terminal of each analog switch 41 (42, 43 and 44) is connected to the connecting point between a pair of resistors 41a, 41b (42a, 42b; 43a, 43b; 44a, 44b). One resistor of each pair, e.g., resistor 41a, (42a, 43a and 44a) has applied thereto, a predetermined voltage from a voltage supply means. The other terminal of each analog switch 41, 42, 43 and 44 is connected to the inverting terminal (−) of comparator 5.

A variable voltage divider is formed by thermistor 6 and resistor 6a, the output of which is applied to the non-inverting terminal (+) of comparator 5. The output terminal of comparator 5 is connected to relay coil 7a of relay 7 to control the operation of the refrigerating apparatus. Relay terminal 7b of relay 7 is disposed in the compressor driving circuit to control the operation of compressor 8.

In this embodiment of the temperature control means, each output terminal of decoder 1 outputs a signal indicating a desired condition, such as temperature. If two temperature determining switches are open, output terminal 1a of decoder 1 outputs a High Level signal. If one of the switches is closed and the other open, output terminal 1b of decoder 1 outputs a High Level signal. If the other switch is closed and one is open, output terminal 1c of decoder 1 outputs a High Level signal. If both switches are closed, output terminal 1d of decoder 1 outputs a High Level signal.

When both switches 2 and 3 are open, first output terminal 1a of decoder 1 has a High Level output signal. Thus, the first analog switch 41 is energized, and a first predetermined voltage, which is determined by the voltage supply means and the resistance of resistors 41a, 41b, is applied to the inverting terminal (−) of comparator 5. The resistance of thermistor 6 is changed in accordance with the temperature in the chamber. Therefore, a variable voltage which reflects the temperature in the chamber is applied to the non-inverting terminal (+) of comparator 5.

In this embodiment, if the temperature in the chamber exceeds the predetermined temperature, the input voltage of the noninverting terminal (+) of comparator 5 exceeds the input voltage on inverting terminal (−) of comparator 5. Thus, the comparator 5 has a High Level output signal which energizes relay 7 to drive the refrigerating apparatus, thereby causing the chamber to be refrigerated. On the other hand, if the temperature in the chamber is below the predetermined temperature, comparator 5 has a Low Level output signal, which interrupts the operation of the refrigerating apparatus.

While the above explanation describes the operation of the circuit for the condition when switch 41 is energized, it will be apparent to those of ordinary skill in the art that the circuit operates in the same manner when switches 42, 43 and 44 are energized. Therefore, in this embodiment of the present invention, four different predetermined temperature levels can be employed in accordance with the operation of two switches.

This invention has been described in detail in connection with a preferred embodiment. This invention, however, is merely for example only and this invention is not restricted thereto. It will be easily understood by those skilled in the art that other variations and modifications can be easily be made within the scope of this invention, as defined by the appended claims. For example, one of ordinary skill in the art could provide more than two switches if more predetermined temperature levels are needed or desired.

I claim:

1. A temperature control device for controlling a refrigerating apparatus comprising:

temperature level determining means for determining a plurality of desired temperature levels;

temperature selecting means for selecting one of said plurality of desired temperature levels;

temperature sensing means for sensing the actual temperature;

comparator means for comparing said desired temperature with said sensed temperature to determine if said sensed temperature corresponds to said desired temperature; and control means for controlling said refrigerating apparatus in accordance with an output of said comparator means;

wherein said temperature selecting means comprises:

a plurality of temperature determining switch means for determining a desired temperature level;

decoder means for decoding the state of said temperature determining switches;

a plurality of analog switches, each of said analog switches being connected between said decoder and said comparator;

wherein one of said analog switches is energized in accordance with an output of said decoder means to enable a representation of a desired temperature level to be provided to said comparator means.

2. The device of claim 1 wherein only one of said analog switches is energized in accordance with an output of said decoder means.

3. A method of controlling a refrigerating apparatus, comprising the steps of:

providing means for determining a plurality of desired temperature levels;

selecting one of said plurality of desired temperature levels;

sensing the actual temperature level;

comparing said desired temperature level with said sensed temperature level to determine the coincidence therebetween; and controlling said refrigerating apparatus in accordance with the coincidence of said desired temperature and said sensed temperature;

wherein said step of selecting one of said plurality of desired temperature levels comprises manipulating a plurality of temperature determining switches and providing a decoded representation of the state of said switches to activate one of a plurality of analog switches, said switches being operatively connected between a decoder and a comparator to enable a representation of said desired temperature level to be provided to said comparator.

4. A temperature control device for controlling a refrigerating apparatus comprising:

temperature level determining means for determining a plurality of desired temperature levels;

temperature selecting means for selecting one of said plurality of desired temperature levels;

temperature sensing means for sensing the actual temperature;

comparator means for comparing said desired temperature with said sensed temperature to determine if said sensed temperature corresponds to said desired temperature; and control means for controlling said refrigerating apparatus in accordance with an output of said comparator means;

wherein said temperature level determining means comprises:

voltage supply means for supplying a voltage to said comparator means; and a plurality of pairs of resistors connected to said voltage suppy means, wherein each pair of resistors forms a voltage divider to allow a portion of said voltage to be provided to said comparator, said portion of said voltage provided to said comparator representing a desired temperature level.

5. The device of claim 4 wherein said temperature selecting means operates to enable only one pair of said plurality of pairs of resistors to provide a portion of said voltage to said comparator means.

6. The device of claim 4 wherein said temperature sensing means comprises a resistor whose resistance varies in accordance with its temperature.

* * * * *